(12) United States Patent
Bannai

(10) Patent No.: US 8,705,220 B2
(45) Date of Patent: Apr. 22, 2014

(54) SURGE ARRESTER AND GAS-INSULATED ELECTRIC APPARATUS

(75) Inventor: Kazuhide Bannai, Urayasu (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/484,874

(22) Filed: May 31, 2012

(65) Prior Publication Data

US 2012/0320488 A1 Dec. 20, 2012

(30) Foreign Application Priority Data

Jun. 20, 2011 (JP) ................................. 2011-136781

(51) Int. Cl.
*H02H 1/00* (2006.01)
(52) U.S. Cl.
USPC .......................................... 361/117; 361/120
(58) Field of Classification Search
USPC ................................................. 361/117–120
See application file for complete search history.

(56) References Cited

U.S. PATENT DOCUMENTS

| 3,037,152 A | 5/1962 | Bergström |
| 4,803,436 A * | 2/1989 | Kresge et al. .................. 324/549 |
| 6,525,917 B1 * | 2/2003 | Arita et al. ....................... 361/63 |

FOREIGN PATENT DOCUMENTS

JP 6-283315 10/1994

OTHER PUBLICATIONS

Office Action issued Oct. 1, 2013 in Russian Patent Application No. 2012125608 with English language translation.

* cited by examiner

*Primary Examiner* — Danny Nguyen
(74) *Attorney, Agent, or Firm* — Oblon, Spivak, McClelland, Maier & Neustadt, L.L.P.

(57) ABSTRACT

A surge arrester according to an embodiment of the present invention includes a switching unit connected to a gas-insulated electric equipment in which insulating gas is sealed, and switching a limited voltage of the surge arrester into a limited voltage smaller than a low-temperature critical voltage indicating a withstand voltage generating a dielectric breakdown when the insulating gas is liquefied.

8 Claims, 5 Drawing Sheets

SURGE ARRESTER AND GAS-INSULATED ELECTRIC APPARATUS

CROSS-REFERENCE TO RELATED APPLICATION

This application is based upon and claims the benefit of priority from the prior Japanese Patent Application No. 2011-136781, filed on Jun. 20, 2011; the entire contents of which are incorporated herein by reference.

FIELD

Embodiments described herein relate generally to a surge arrester and a gas-insulated electric apparatus.

BACKGROUND

Conventionally, gas-insulated electric equipment such as a gas-insulated switchgear (GIS), a gas-insulated bus (GIB), and so on in which insulating gas is sealed are provided at an electric power system. In the gas-insulated electric equipment, a center conductor is stored in a grounded metal tank in which the insulating gas is sealed, and insulation between the metal tank and the center conductor is maintained.

However, in case of a gas-insulated electric equipment using $SF_6$ gas as the insulating gas, liquefaction of the sealed $SF_6$ gas occurs and internal sealed gas pressure is lowered under a low-temperature surrounding environment lower than −25° C., and therefore, a problem in which insulation performance deteriorates occurs. Accordingly, the gas-insulated electric equipment is placed indoor where it does not become low-temperature to avoid the liquefaction of the $SF_6$ gas when the gas-insulated electric equipment is applied under the low-temperature surrounding environment.

However, the gas-insulated electric equipment is necessary to be connected at outdoor to secure an insulation distance in the atmosphere when the gas-insulated electric equipment is necessary to be connected in the atmosphere to be connected to an overhead power line and a voltage transformer circuit. In this case, a part of the gas-insulated electric equipment leading to an air connection part is placed under the low-temperature surrounding environment.

In general, the sealed insulating gas is not liquefied when the conductor stored in the metal tank of the gas-insulated electric equipment is conducted because it is heated by heat generation of the conductor. On the other hand, a gas pressure of the gas-insulated electric equipment is lowered to approximately an atmospheric pressure because the liquefaction of the $SF_6$ gas sealed at a high-pressure exceeding the atmospheric pressure occurs in accordance with lowering of a surrounding temperature when it is not conducted. It is impossible to maintain the insulation ability for a high impulse voltage such as a thunderstorm when the pressure of the insulating gas is lowered to approximately the atmospheric pressure.

Accordingly, in order to prevent that the insulation performance deteriorates caused by the liquefaction of the insulating gas under the low-temperature surrounding environment, a measure such that the gas-insulated electric equipment is heated by an external electric heat source and so on is proposed.

However, it is necessary to be constantly conducted to heat and operational electric power is lost in the conventional method heating by the external electric power source. In addition, there is a possibility in which reliability of a whole of the equipment deteriorates because a problem in which the liquefaction of the insulating gas occurs cannot be solved at a trouble time of the external electric power source.

DETAILED DESCRIPTION

A surge arrester in an embodiment of the present invention includes a switching unit connected to a gas-insulated electric equipment in which insulating gas is sealed, and switching a limited voltage of the surge arrester into a limited voltage smaller than a low-temperature critical voltage indicating a withstand voltage generating a dielectric breakdown when the insulating gas is liquefied.

The surge arrester and a gas-insulated electric apparatus according to an embodiment of the present invention are described with reference to the drawings.

First Embodiment (Configuration)

Figure 1:
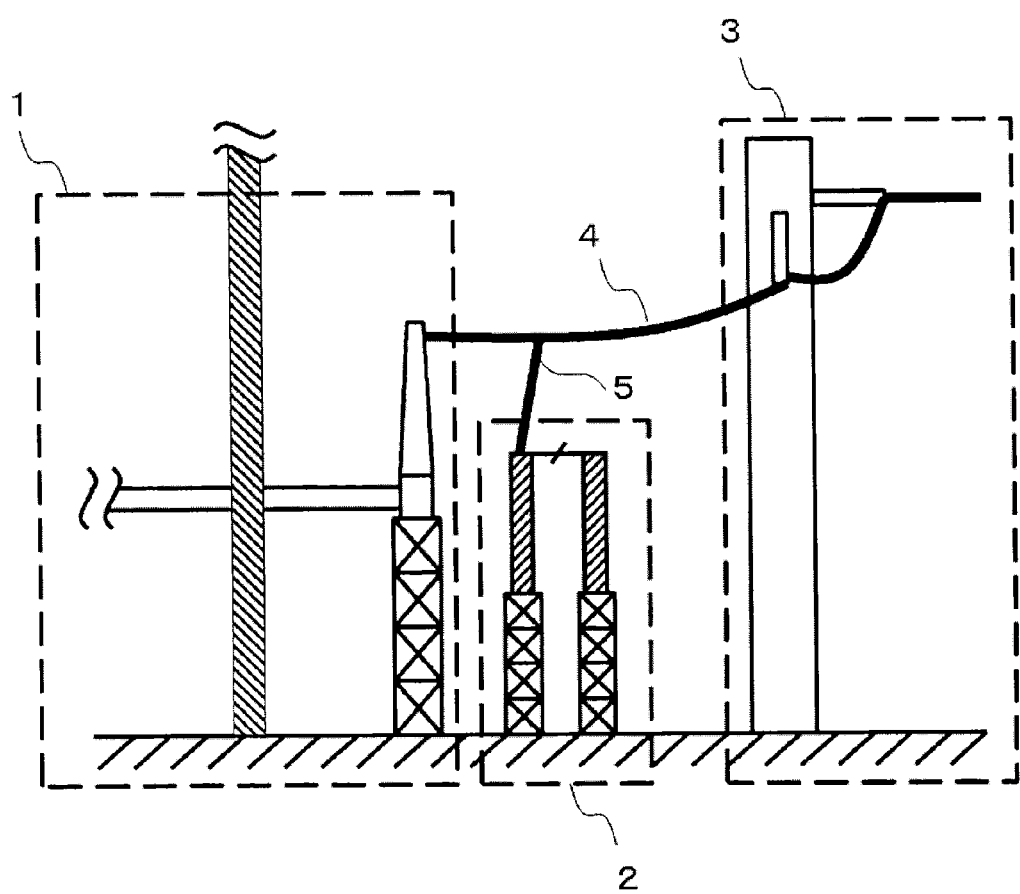
FIG. 1 is a view illustrating a configuration of a gas-insulated electric apparatus in a first embodiment.

A gas-insulated electric apparatus according to a first embodiment is described by using FIG. 1. Here, the gas-insulated electric apparatus includes a gas-insulated electric equipment and a zinc oxide surge arrester, and the gas-insulated electric equipment is a gas-insulated bus 1 in which $SF_6$ gas is sealed.

FIG. 1 illustrates a configuration chart of the gas-insulated bus 1 connected to an overhead power line 3 and a surge arrester 2. Here, the gas-insulated bus 1 is connected to the overhead power line 3 via a connection line 4. The zinc oxide surge arrester 2 is connected to the connection line 4 via a connection line 5.

Figure 2:
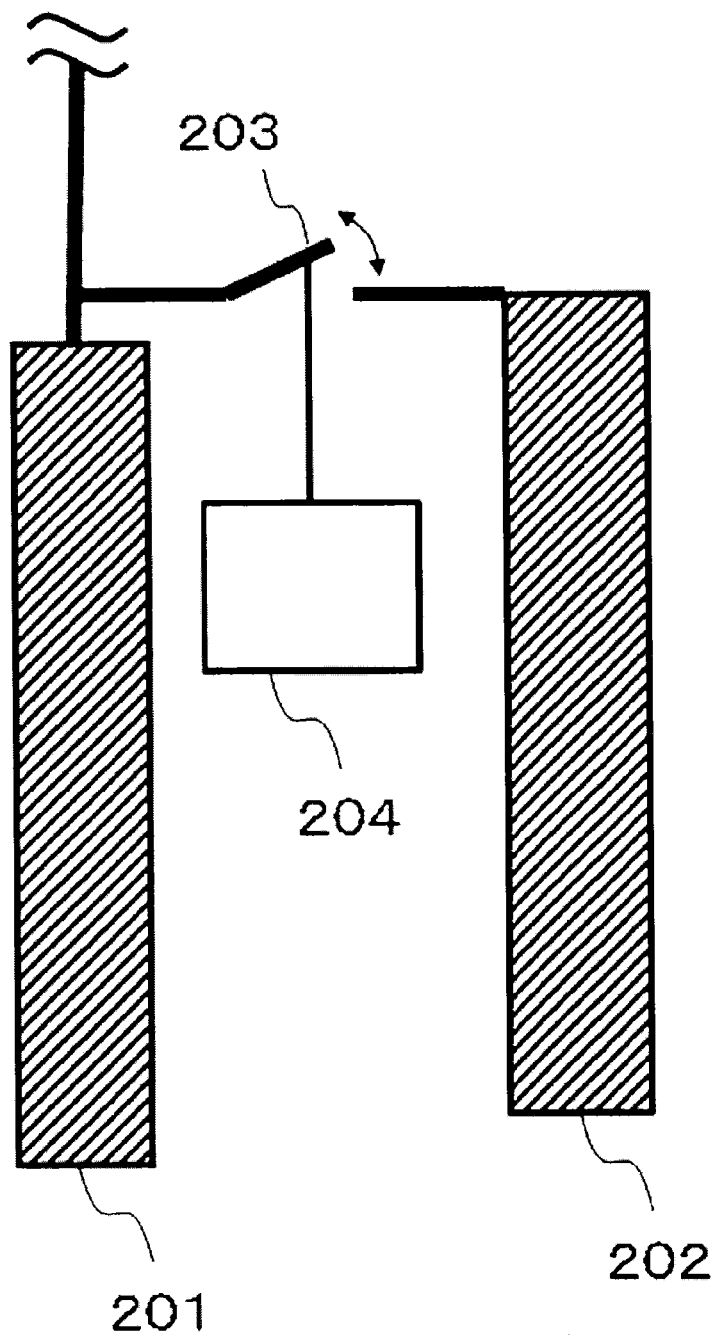
FIG. 2 is a view illustrating a configuration of a surge arrester in the first embodiment.

Next, a configuration of the zinc oxide surge arrester 2 is described by using FIG. 2. The zinc oxide surge arrester 2 includes a first zinc oxide element (high-temperature surge arresting unit) 201, a second zinc oxide element (low-temperature surge arresting unit) 202, a disconnecting switch 203 and a control unit 204 (switching unit).

The first and second zinc oxide elements 201, 202 are both made up by zinc oxide and have predetermined limited voltages. The first and second zinc oxide elements 201, 202 start discharging when an impulse voltage higher than the limited voltage such as a thunderstorm is applied. Accordingly, a voltage at the limited voltage or more is not applied to the gas-insulated bus 1. As illustrated in FIG. 2, the first and second zinc oxide elements 201, 202 are disposed in parallel with each other.

The first zinc oxide element 201 is connected to the gas-insulated bus 1 via plural connection lines 4, 5 (refer to FIG. 1). Besides, the second zinc oxide element 202, which is provided side by side with the first zinc oxide element 201, is connected to the gas-insulated bus 1 via the disconnecting switch 203 and the plural connection lines 4, 5. Besides, a limited voltage V1 of the first zinc oxide element 201 and a limited voltage V2 of the second zinc oxide element 202 are different, and the limited voltages V1, V2 are respectively determined by expressions (1), (2).

In the expressions (1), (2), a reference symbol Va represents a voltage value of a commercial frequency system applied to the gas-insulated bus 1, the overhead power line 3, the connection line 4, and so on. A reference symbol Vb represents a critical voltage in which insulation can be maintained at a normal time when the $SF_6$ gas filled in the gas-insulated bus 1 is not liquefied (hereinafter, the Vb is called as a high-temperature critical voltage). A reference symbol Vc represents a critical voltage in which the insulation can be maintained when the $SF_6$ gas filled in the gas-insulated bus 1 is liquefied caused by the low-temperature surrounding environment. Therefore, the Vc is normally a value smaller than the Vb (hereinafter, the Vc is called as a low-temperature critical voltage).

For example, when the commercial frequency system voltage value Va is at 500 kV, a gas pressure of the $SF_6$ gas is maintained at a high-pressure of approximately 0.4 MPa because the $SF_6$ gas sealed in the gas-insulated bus 1 is not liquefied when the center conductor stored in the gas-insulated bus 1 is conducted. Accordingly, the critical voltage capable of maintaining the insulation in the gas-insulated bus 1 at the gas pressure of 0.4 MPa is set to be the high-temperature critical voltage Vb.

Further, when the electricity to the center conductor is stopped and the $SF_6$ gas is liquefied under the surrounding environment of −50° C., the gas pressure is lowered to a low-pressure of approximately 0.1 MPa. Accordingly, the critical voltage capable of maintaining the insulation in the gas-insulated bus 1 at the gas pressure of 0.1 MPa is set to be the low-temperature critical voltage Vc.

$$Va<V1<Vb \quad (1)$$

$$Va<V2<Vc \quad (2)$$

The disconnecting switch 203 is connected to the connection line 5. It is constantly in an open state, but it is closed and becomes a closed state when a close instruction is input by the control unit 204.

The control unit 204 outputs the close instruction to the disconnecting switch 203 when it detects that the gas pressure in the gas-insulated bus 1 becomes smaller than a threshold value set in advance.

(Operations)

Next, operations when the high impulse voltage of 1000 kV is applied caused by a thunderbolt and so on to the overhead power line 3 are described when the limited voltage V1 of the first zinc oxide element 201 is set to be 1400 kV, and the limited voltage V2 of the second zinc oxide element 202 is set to be 600 kV. Here, it is described while dividing into a case when the $SF_6$ gas sealed in the gas-insulated bus 1 is liquefied and a case when the $SF_6$ gas is not liquefied.

(When $SF_6$ Gas is not Liquefied)

When the $SF_6$ gas is not liquefied, the disconnecting switch 203 is in the open state, and therefore, the first zinc oxide element 201 is electrically connected to the gas-insulated bus 1, and the second zinc oxide element 202 is not in a state electrically connected to the gas-insulated bus 1. Accordingly, when the thunderbolt falls on the overhead power line 3 and the high impulse voltage of 1000 kV is applied to the gas-insulated bus 1 via the connection line 4, the discharge does not occur at the first zinc oxide element 201 because the limited voltage V1 of the first zinc oxide element 201 is 1400 kV. Accordingly, the high impulse voltage of 1000 kV is applied to the gas-insulated bus 1, but the high-temperature critical voltage Vb is larger than 1400 kV being the limited voltage V1 of the first zinc oxide element 201, and therefore, a dielectric breakdown does not occur in the gas-insulated bus 1.

(When $SF_6$ Gas is Liquefied)

When the $SF_6$ gas is liquefied and the gas pressure in the gas-insulated bus 1 becomes smaller than the threshold value set in advance, the control unit 204 outputs the close instruction to the disconnecting switch 203 to make the disconnecting switch 203 at the closed state. The second zinc oxide element 202 is thereby electrically connected to the gas-insulated bus 1. Therefore, when the thunderbolt falls on the overhead power line 3 and the high impulse voltage of 1000 kV is applied to the second zinc oxide element 202 via the connection line 4, the discharge occurs at the second zinc oxide element 202 because the limited voltage V2 of the second zinc oxide element 202 is 600 kV. Accordingly, the dielectric breakdown does not occur in the gas-insulated bus 1 because the high impulse voltage is not applied to the gas-insulated bus 1.

(Effect)

As stated above, according to the present embodiment, the limited voltage V2 of the second zinc oxide element 202 is smaller than the low-temperature critical voltage Vc, and the second zinc oxide element 202 is connected to the gas-insulated bus 1 via the disconnecting switch 203. When the $SF_6$ gas is liquefied by the low-temperature surrounding environment, the control unit 204 turns the disconnecting switch 203 electrically connected to the gas-insulated bus 1 from the open state (off state) to the closed state (on state) to electrically connect the gas-insulated bus 1 and the second zinc oxide element 202. Thereby, the control unit 204 switches the limited voltage of the zinc oxide surge arrester 2 from the limited voltage V1 higher than the low-temperature critical voltage Vc to the limited voltage V2 smaller than the low-temperature critical voltage Vc. Accordingly, the dielectric breakdown does not occur in the gas-insulated bus 1 even when the $SF_6$ gas is liquefied caused by the low-temperature surrounding environment.

Besides, the external electric power source is not used, and therefore, operational electric power loss does not occur, and reliability of the gas-insulated bus 1 can be improved.

Note that the control unit 204 detects that the gas pressure in the gas-insulated bus 1 becomes smaller than a threshold voltage set in advance and outputs the close instruction to the disconnecting switch 203 in this embodiment, but it is not limited thereto. The control unit 204 may detect that the electricity is stopped by a current transformer and so on provided at the gas-insulated bus 1, and outputs the close instruction. Namely, it may be constituted such that the above-stated switching operation is performed when a flowing current value becomes lower than a threshold value set in advance while the conductor stored in the gas-insulated electric equipment is conducted.

Besides, the control unit 204 may be provided at the gas-insulated bus 1, or may be substituted by a supervisory control device, a protection and control device, a PC and so on provided at a distance, and it is possible to output the close instruction by operating the control unit 204 by a user. Further, the disconnecting switch 203 and the control unit 204 may be connected via a network, and it is possible to control the open and close states of the disconnecting switch 203 from remote location by using the network.

Second Embodiment

Figure 3:
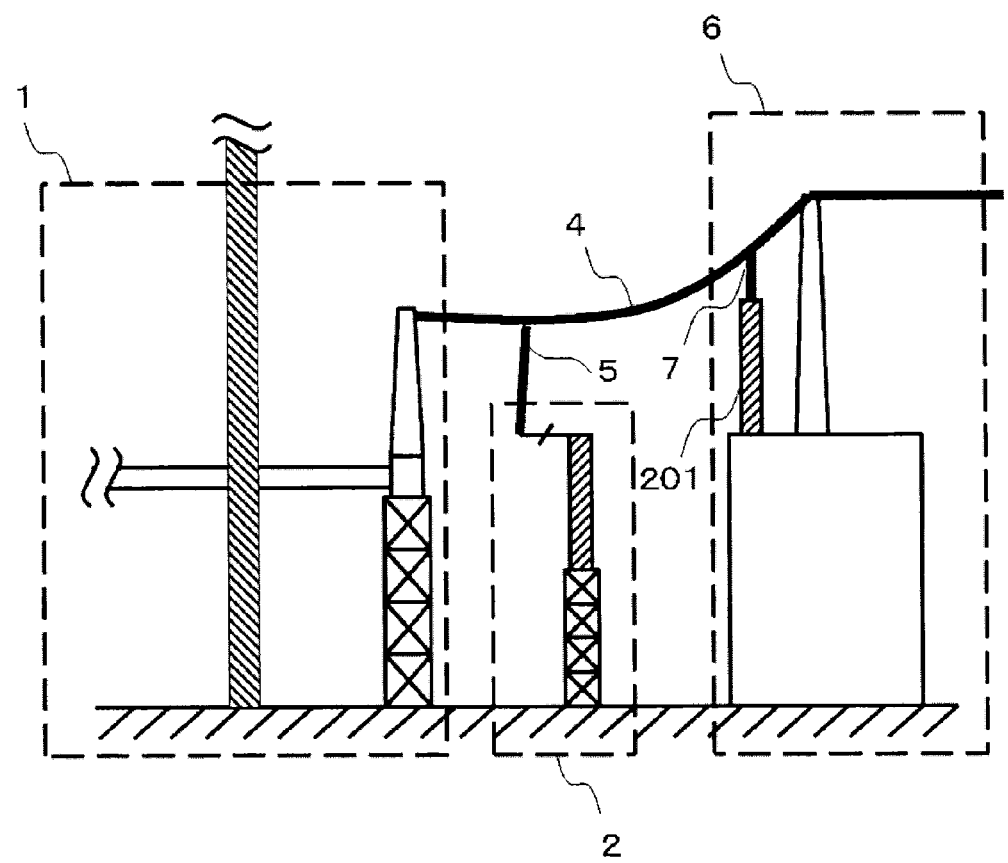
FIG. 3 is a view illustrating a configuration of a gas-insulated electric apparatus in a second embodiment.

A gas-insulated electric equipment of a second embodiment is described by using FIG. 3. Here, the gas-insulated electric equipment is a gas-insulated bus in which the $SF_6$ gas is sealed, and FIG. 3 illustrates a configuration chart of the gas-insulated bus connected to a gas-insulated transformer.

Different points of the present embodiment from the first embodiment are that the overhead power line 3 is substituted by a gas-insulated transformer 6, and the first zinc oxide element 201 is provided at the gas-insulated transformer 6 as illustrated in FIG. 3. The same reference symbols are used to designate the same elements as the first embodiment, and descriptions thereof are not given.

The first zinc oxide element 201 provided at the gas-insulated transformer 6 is electrically connected to the connection line 4 via a connection line 7.

Operations of the present embodiment are similar to the first embodiment, and therefore, detailed descriptions are not given. In the present embodiment, when the control unit 204 judges that the gas pressure of the $SF_6$ gas sealed in the gas-insulated bus 1 becomes smaller than the threshold value set in advance, the control unit 204 closes the disconnecting switch 203 and makes it at the closed state, and thereby, the second zinc oxide element 202 of which limited voltage V2 is low is electrically connected to the gas-insulated transformer 6 as same as the first embodiment. Namely, the zinc oxide surge arrester 2 is switched from the limited voltage V1 of the first zinc oxide element 201 which is higher than the low-temperature critical voltage Vc to the limited voltage V2 of the second zinc oxide element 202 which is smaller than the low-temperature critical voltage Vc. Accordingly, the high impulse voltage is not applied to the gas-insulated bus 1 even under the low-temperature surrounding environment in which the $SF_6$ gas is liquefied, and therefore, the dielectric breakdown does not occur in the gas-insulated bus 1.

According to the present embodiment, it is possible to obtain the similar effect as the first embodiment also as for the gas-insulated bus 1 connected to the gas-insulated transformer 6.

Third Embodiment

Figure 4:
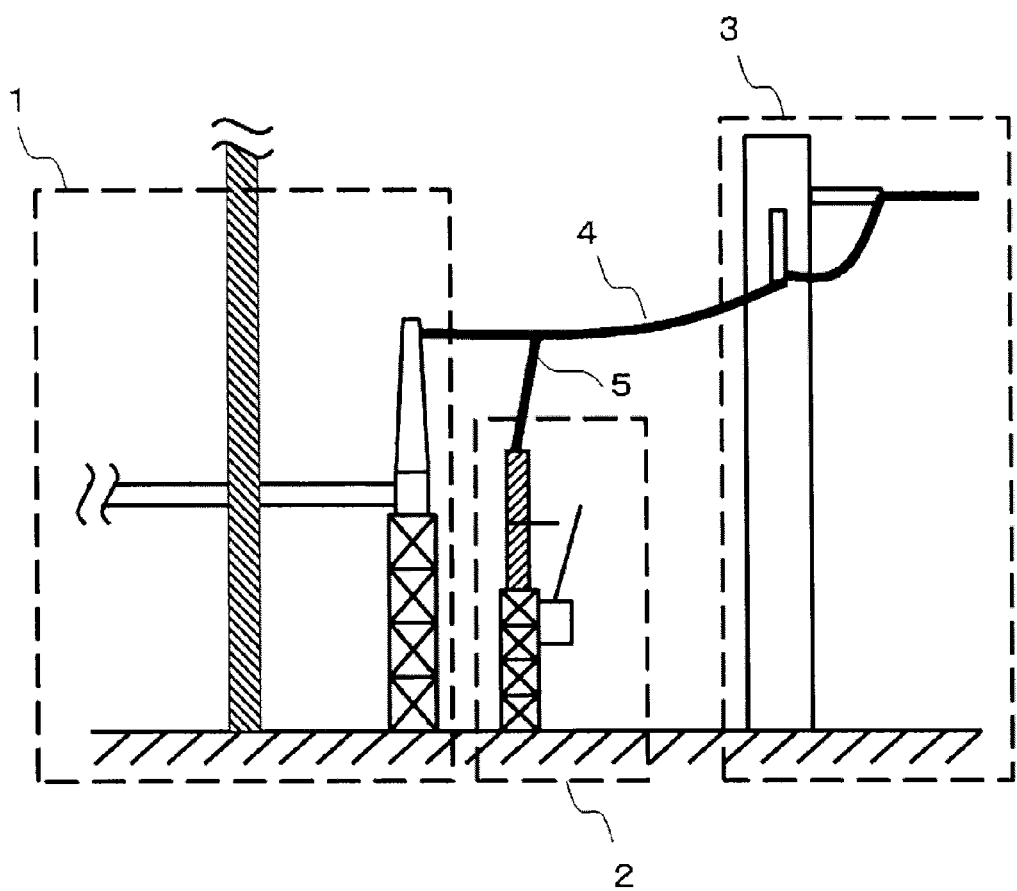
FIG. 4 is a view illustrating a configuration of a gas-insulated electric apparatus in a third embodiment.

A gas-insulated electric equipment according to a third embodiment is described by using FIG. 4. Here, the gas-insulated electric equipment is a gas-insulated bus in which the $SF_6$ gas is sealed, and FIG. 4 illustrates a configuration chart of the gas-insulated bus connected to an overhead power line.

As illustrated in FIG. 4, the gas-insulated bus 1 is electrically connected to the overhead power line 3 via the connection line 4. The zinc oxide surge arrester 2 is electrically connected to the connection line 4 via the connection line 5. The present embodiment and the first embodiment are different in a configuration of the zinc oxide surge arrester 2.

Figure 5:
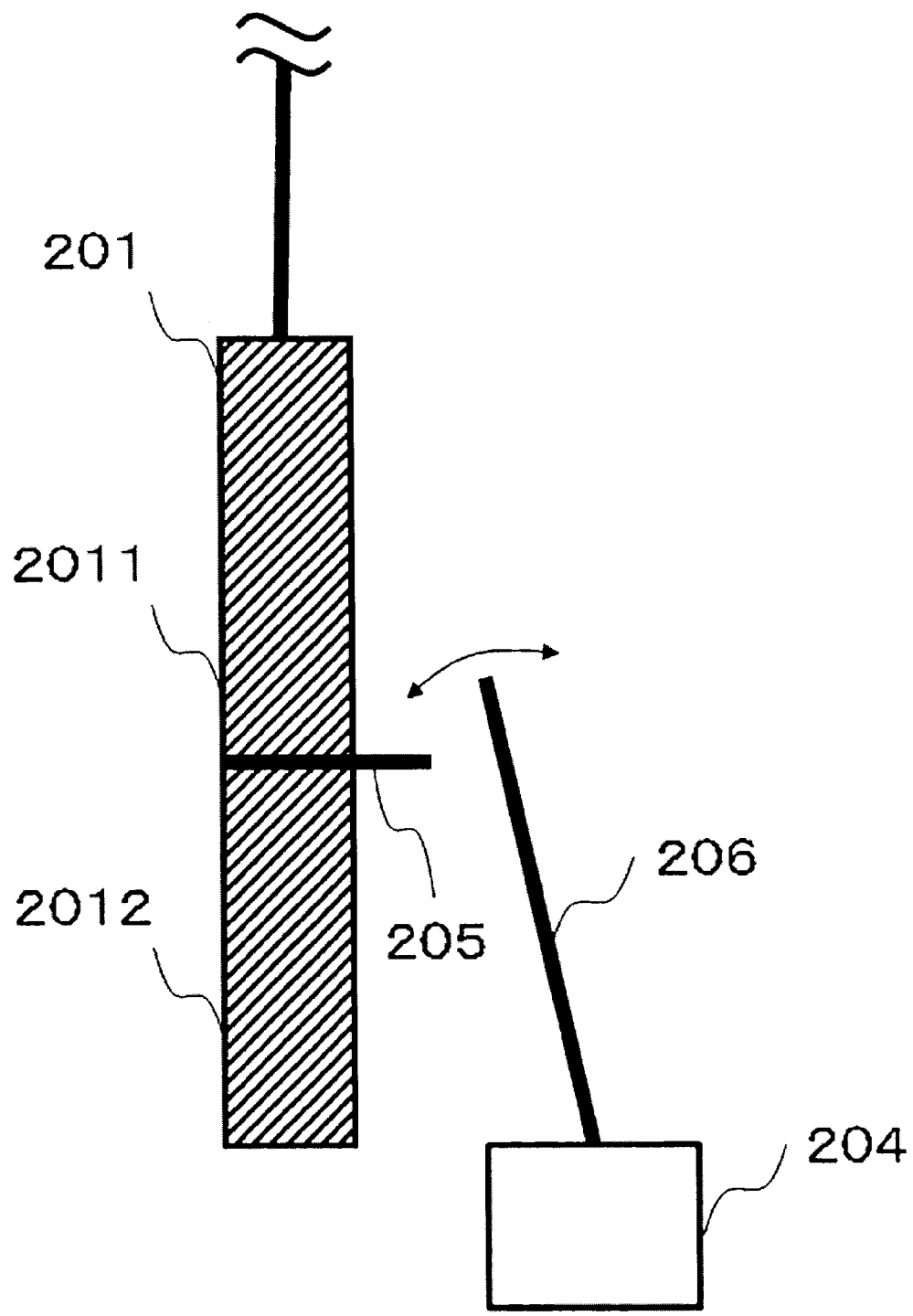
FIG. 5 is a view illustrating a configuration of a surge arrester in the third embodiment.

The configuration of the zinc oxide surge arrester 2 of the present embodiment is described by using FIG. 5. The zinc oxide surge arrester 2 includes the zinc oxide element 201, the control unit 204, a conducting terminal 205, and a ground system 206.

The zinc oxide element 201 is divided into two sections of an upper section 2011 and a lower section 2012. The conducting terminal 205 is provided between the two sections 2011, 2012.

The control unit 204 electrically connects the grounded ground system 206 to the conducting terminal 205 when the control unit 204 detects that the gas pressure in the gas-insulated bus 1 becomes smaller than the threshold value set in advance. The ground system 206 and the conducting terminal 205 are electrically connected, and thereby, the lower section 2012 of the zinc oxide element 201 is practically ignored. Accordingly, the limited voltage V2 when the ground system 206 and the conducting terminal 205 are electrically connected becomes lower than the limited voltage V1 when they are not electrically connected in the zinc oxide element 201.

Here, the limited voltage V1 under a state in which the ground system 206 is not connected to the conducting terminal 205 and the limited voltage V2 under a connected state are respectively adjusted to be within ranges represented by the expressions (1), (2) in the first embodiment, in the zinc oxide element 201. Specifically, lengths of the upper section 2011 and the lower section 2012 are adjusted to be within the above-stated ranges in the zinc oxide element 201.

(Operations)

Next, operations when the high impulse voltage of 1000 kV is applied caused by the thunderbolt and so on to the overhead power line 3 are described when the limited voltage V1 before connection is set to be 1400 kV, and the limited voltage V2 after connection is set to be 600 kV in the zinc oxide element 201. Here, it is described while dividing into a case when the $SF_6$ gas sealed in the gas-insulated bus 1 is liquefied and a case when it is not liquefied.

(When $SF_6$ Gas is not Liquefied)

When the $SF_6$ gas is not liquefied, the conducting terminal 205 and the ground system 206 are not electrically connected with each other, and therefore, the limited voltage of the zinc oxide element 201 is 1400 kV (V1). So, the discharge does not occur at the zinc oxide element 201 even if the high impulse voltage of 1000 kV is applied to the zinc oxide element 201 caused by the thunderbolt to the overhead power line 3. Accordingly, the high impulse voltage of 1000 kV is applied to the gas-insulated bus 1 via the connection line 4, but the dielectric breakdown does not occur in the gas-insulated bus 1 because the high-temperature critical voltage Vb is larger than 1400 kV.

(When $SF_6$ Gas is Liquefied)

When the $SF_6$ gas is liquefied and the control unit 204 judges that the gas pressure of the $SF_6$ gas in the gas-insulated bus 1 becomes smaller than the threshold value set in advance, the control unit 204 electrically connects the conducting terminal 205 and the ground system 206. So, the limited voltage of the zinc oxide element 201 decreases from 1400 kV (V1) to 600 kV (V2). If the high impulse voltage of 1000 kV is applied to the zinc oxide element 201 via the connection line 4 caused by the thunderbolt to the overhead power line 3, the discharge occurs at the zinc oxide element 201. Accordingly, the high impulse voltage is not applied to the gas-insulated bus 1, and therefore, the dielectric breakdown does not occur in the gas-insulated bus 1.

(Effect)

According to the present embodiment, it is not necessary to provide two zinc oxide elements, and therefore, materials and costs can be reduced in addition to the effect of the first embodiment.

Note that in the above-stated first to third embodiments, it is constituted by using the zinc oxide surge arrester using the zinc oxide element as the surge arrester, but the similar effect can be obtained by using a gap-type surge arrester.

According to the embodiments of the present invention, it becomes possible to provide a surge arrester and a gas-insulated electric apparatus suppressing occurrence of dielectric breakdown without using an external electric heat source even when they are provided under a low-temperature surrounding environment.

While certain embodiments have been described, these embodiments have been presented by way of example only, and are not intended to limit the scope of the inventions.

Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A surge arrester which is connected to a gas-insulated electric equipment in which insulating gas is sealed, comprising:
   a switching unit switching a limited voltage of the surge arrester into a limited voltage smaller than a low-temperature critical voltage indicating a withstand voltage generating a dielectric breakdown when the insulating gas is liquefied;
   a high-temperature surge arresting unit connected to the gas-insulated electric equipment and having a limited voltage smaller than a high-temperature critical voltage indicating a withstand voltage generating the dielectric breakdown when the insulating gas is at a predetermined gas pressure; and
   a low-temperature surge arresting unit connected to a disconnecting switch connected to the gas-insulated electric equipment, and having a limited voltage at the low-temperature critical voltage or less,
   wherein the switching unit switches the limited voltage of the surge arrester into the limited voltage smaller than the low-temperature critical voltage by setting the disconnecting switch from an open state to a closed state to electrically connect between the gas-insulated electric equipment and the low-temperature surge arresting unit.

2. A surge arrester which is connected to a gas-insulated electric equipment in which insulating gas is sealed, comprising:
   a switching unit switching a limited voltage of the surge arrester into a limited voltage smaller than a low-temperature critical voltage indicating a withstand voltage generating a dielectric breakdown when the insulating gas is liquefied,
   wherein the gas-insulated electric equipment is connected to an electric equipment including a high-temperature surge arresting unit having a limited voltage smaller than a high-temperature critical voltage indicating a withstand voltage generating the dielectric breakdown when the insulating gas is at the predetermined gas pressure,
   the surge arrester further includes a low-temperature surge arresting unit connected to a disconnecting switch connected to the gas-insulated electric equipment and having a limited voltage at the low-temperature critical voltage or less; and
   wherein the switching unit switches the limited voltage of the surge arrester into the limited voltage smaller than the low-temperature critical voltage by setting the disconnecting switch from an open state to a closed state to electrically connect between the gas-insulated electric equipment and the low-temperature surge arresting unit.

3. A surge arrester which is connected to a gas-insulated electric equipment in which insulating gas is sealed, comprising:
   a switching unit switching a limited voltage of the surge arrester into a limited voltage smaller than a low-temperature critical voltage indicating a withstand voltage generating a dielectric breakdown when the insulating gas is liquefied;
   a high-temperature surge arresting unit having a limited voltage smaller than a high-temperature critical voltage indicating a withstand voltage generating the dielectric breakdown when the insulating gas is at a predetermined gas pressure, and divided into plural sections; and
   a conducting terminal provided between the sections of the high-temperature surge arresting unit,
   wherein the switching unit switches the limited voltage of the high-temperature surge arresting unit into the limited voltage at the low-temperature critical voltage or less by grounding the conducting terminal.

4. The surge arrester according to any one of claims 1 to 3, wherein the switching unit switches the limited voltage into the limited voltage at the low-temperature critical voltage or less when the switching unit detects either the gas pressure of the insulating gas sealed inside the gas-insulated electric equipment becomes lower than a gas pressure threshold value set in advance or electricity to a conductor stored in the gas-insulated electric equipment becomes lower than a current value threshold value set in advance.

5. A gas-insulated electric apparatus, comprising:
   a gas-insulated electric equipment in which insulating gas is sealed; and
   a surge arrester connected to the gas-insulated electric equipment, the surge arrester including a switching unit switching a limited voltage into a limited voltage smaller than a low-temperature critical voltage indicating a withstand voltage generating a dielectric breakdown when the insulating gas is liquefied;
   a high-temperature surge arresting unit connected to the gas-insulated electric equipment and having a limited voltage smaller than a high-temperature critical voltage indicating a withstand voltage generating the dielectric breakdown when the insulating gas is at a predetermined gas pressure; and
   a low-temperature surge arresting unit connected to a disconnecting switch connected to the gas-insulated electric equipment, and having a limited voltage at the low-temperature critical voltage or less,
   wherein the switching unit switches the limited voltage of the surge arrester into the limited voltage smaller than the low-temperature critical voltage by setting the disconnecting switch from an open state to a closed state to electrically connect between the gas-insulated electric equipment and the low-temperature surge arresting unit.

6. A gas-insulated electric apparatus, comprising:
   a gas-insulated electric equipment in which insulating gas is sealed; and
   a surge arrester connected to the gas-insulated electric equipment, the surge arrester including a switching unit switching a limited voltage into a limited voltage smaller than a low-temperature critical voltage indicating a withstand voltage generating a dielectric breakdown when the insulating gas is liquefied;
   wherein the gas-insulated electric equipment is connected to an electric equipment including a high-temperature surge arresting unit having a limited voltage smaller than a high-temperature critical voltage indicating a withstand voltage generating the dielectric breakdown when the insulating gas is at a predetermined gas pressure,
   the gas-insulated electric apparatus includes a low-temperature surge arresting unit connected to a disconnecting switch connected to the gas-insulated electric equipment and having a limited voltage at the low-temperature critical voltage or less; and wherein the switching unit switches the limited voltage of the surge arrester into the limited voltage smaller than the low-temperature critical voltage by setting the disconnecting switch from an open state to a closed state to electrically connect between the gas-insulated electric equipment and the low-temperature surge arresting unit.

7. A gas-insulated electric apparatus, comprising:
a gas-insulated electric equipment in which insulating gas is sealed; and
a surge arrester connected to the gas-insulated electric equipment, the surge arrester including a switching unit switching a limited voltage into a limited voltage smaller than a low-temperature critical voltage indicating a withstand voltage generating a dielectric breakdown when the insulating gas is liquefied;
a high-temperature surge arresting unit having a limited voltage smaller than a high-temperature critical voltage indicating a withstand voltage generating the dielectric breakdown when the insulating gas is at a predetermined gas pressure, and divided into plural sections; and
a conducting terminal provided between the sections of the high-temperature surge arresting unit,
wherein the switching unit switches the limited voltage of the high-temperature surge arresting unit into the limited voltage at the low-temperature critical voltage or less by grounding the conducting terminal.

8. The gas-insulated electric apparatus according to any one of claims 5 to 7,
wherein the gas-insulated electric apparatus switches the limited voltage into the limited voltage at the low-temperature critical voltage or less when either the gas pressure of the insulating gas sealed inside the gas-insulated electric equipment becomes lower than a gas pressure threshold value set in advance, or electricity to a conductor stored in the gas-insulated electric equipment becomes lower than a current value threshold value set in advance is detected.

* * * * *